United States Patent
Borsinger et al.

(10) Patent No.: US 6,890,982 B2
(45) Date of Patent: May 10, 2005

(54) WAX FOR HOT MELT ADHESIVE APPLICATIONS

(75) Inventors: Gregory Borsinger, Chatham, NJ (US); Aziz Hassan, Sugarland, TX (US)

(73) Assignee: Marcus Oil and Chemical-Corp., Houston, TX (US)

( * ) Notice: Subject to any disclaimer, the term of this patent is extended or adjusted under 35 U.S.C. 154(b) by 0 days.

(21) Appl. No.: 10/166,959

(22) Filed: Jun. 11, 2002

(65) Prior Publication Data

US 2003/0229168 A1 Dec. 11, 2003

(51) Int. Cl.[7] ............................................. C08L 91/06
(52) U.S. Cl. ..................... 524/277; 524/272; 524/274; 524/275
(58) Field of Search ............................. 524/272, 274, 524/275, 277, 177

(56) References Cited

U.S. PATENT DOCUMENTS

| | | | | |
|---|---|---|---|---|
| 3,474,055 A | * | 10/1969 | Dooley | 524/58 |
| 3,573,240 A | | 3/1971 | Flanagan | 524/273 |
| 4,081,415 A | * | 3/1978 | Matubara et al. | 524/488 |
| 4,394,915 A | * | 7/1983 | Nelson | 215/12.2 |
| 4,792,495 A | * | 12/1988 | Taniguchi et al. | 428/32.77 |
| 5,120,781 A | * | 6/1992 | Johnson, Jr. | 524/274 |
| 5,177,133 A | * | 1/1993 | Peck et al. | 524/139 |
| 5,326,413 A | | 7/1994 | Esemplare et al. | 156/154 |
| 5,371,135 A | * | 12/1994 | Suzuki | 524/517 |
| 5,574,084 A | * | 11/1996 | Peacock | 524/270 |
| 6,022,947 A | * | 2/2000 | Frihart et al. | 530/212 |
| 2003/0152707 A1 | * | 8/2003 | Hassan et al. | 427/384 |

OTHER PUBLICATIONS

Notification of Transmittal of the International Search Report, mailed May 19, 2003.
International Search Report—PCT/US 03/00218.

* cited by examiner

*Primary Examiner*—Peter Szekely
(74) *Attorney, Agent, or Firm*—Thomas L. Adams (57) ABSTRACT

Waxes prepared from hydrogenated plant oils, such as palm and soybean, are used as substitutes for petroleum derived waxes in hot-melt adhesive compositions. Unlike petroleum-derived or synthetic waxes, adhesive compositions comprising these waxes, which are obtained from naturally derived, renewable resources, achieve adhesion performance similar to conventional adhesives containing petroleum-derived waxes. The inventive waxes have a low iodine value (between 2–5), and melting points between approximately 120–165 degrees F. (Mettler Drop Point). These waxes comprise a triglyceride whose fatty acids are predominantly stearic acid ($C_{18}$). The naturally derived waxes are used as an alternative to petroleum and synthetically derived waxes in the manufacture of adhesives used to bond paper, wood, glass, plastic and metal in a variety of manufacturing operations.

26 Claims, 4 Drawing Sheets

Fig. 1 Process for the manufacture of Hydrogenated oils

WAX FOR HOT MELT ADHESIVE APPLICATIONS

FIELD OF THE INVENTION

The present invention is a vegetable wax comprising triglycerides with a melting point of from about 50–70 degree C. Particularly, the present invention is used as an additive in hot met adhesive compositions, which are used in bonding articles such as those made from fibrous cellulosic materials, plastic, wood, metal and the like. The adhesive compositions comprise a high molecular weight, ethylene vinyl acetate copolymer with greater than about 18 weight percent vinyl acetate ("VA") and having a melt index greater than about 0.5. Because the waxes of the present invention have melting points that are lower than the melting points of many waxes traditionally used in hot melt adhesives, the compositions of the present invention have melting points which are towards the low end of the melting point spectrum of hot melt adhesives. This can be advantageous from a safety and handling perspective.

BACKGROUND OF THE INVENTION

Hot melt adhesives are versatile in industrial applications such as bonding articles, for example, cardboard boxes, plastics parts, bookbinding and furniture manufacturing. Hot melt adhesives generally comprise 100% solids, and, in commercial applications, are typically used at temperatures at about 350 degrees F. These materials do not generate volatile compounds during the task of bonding, which is particularly advantageous in high-speed packaging operations where there is little time for drying an adhesive that contains solvent. The lack of volatile emissions is also an advantage over adhesives containing organic solvents, because the emission organic solvents, many of which are known to be toxic and may have an adverse effect when released into the environment, may pose environmental and health concerns.

Hot melt adhesive compositions are typically thermoplastic materials that are heated to a molten state for their application to cardboard or corrugated cartons, boxes, plastics and other items that need to be sealed or to be adhered to. For example. after application of the molten adhesive to a substrate such as paper (or similar cellulosic fibrous article), a second item that needs to be bonded to the substrate is placed in contact with the molten hot melt adhesive. As the molten adhesive cools and solidifies, a bond is formed between the substrate and the second item that has utility in many areas of commerce including consumer and industrial packaging.

The time a hot melt adhesive takes to solidify to a point where it can no longer bond with the intended article is called the 'open time'.

The time required for the adhesive to cool to the point where it has enough strength to form a bond is the 'set speed'. Set speed is an important parameter for applications such as high speed packaging lines, where bonding needs to occur rapidly to avoid poorly sealed or unsealed boxes from exiting the packaging line and having to be rejected, for example, in applications where items such as consumer packaged goods are being sealed.

Hot melt adhesives are generally composed of three components: (1) a polymer resin; (2) a tackifier; and (3) a wax. The polymer provides the formulation with its strength and adhesive characteristics. The polymer in the formulations generally range from 25 to 50% by weight of the formulation.

The tackifier allows the polymer to be more adhesive by improving wetting during the application. Tackifying agents are added to give tack to the adhesive and also to lower viscosity. Tack is required in most adhesive formulations to allow for proper joining of articles prior to the hot melt adhesive solidifying.

The wax reduces the overall viscosity of the adhesive, thereby allowing it to liquefy. The wax also controls the open time and set speed of the system. In the present invention, the use of a wax having a low but relatively sharp melting point leads to a hot melt adhesive composition which liquefies at a temperature lower than that of commercially available hot melt adhesives, but still retains good set speed characteristics.

The ratio of polymer to tackifier to wax is generally specific to a particular application's need. In general, the percent wax is minimized and added in sufficient quantities to achieve desired viscosity and set speeds. The level of wax is generally in the range of 15 to 35% by weight of the formulation. The waxes employed in most hot melt adhesive compositions are waxes which are derived from petroleum, such as the paraffins and microcrystalline waxes.

Depending upon the specific application desired, various other components, such as plasticizers, are used in the formulation of hot melt adhesives. Plasticizers reduce the overall viscosity of the adhesive and promote flexibility and wetting. Typical types of plasticizers used are phthalates, glycolates, polybutenes, and mineral oil. See "Adhesive Bonding", Chap. 8 Hot-melt Adhesives, by Thomas Flanagan, at p. 8–3, published by MacMillan.

In formulating adhesives all the ingredients should be compatible, so the formulation does not separate in the molten storage tank. Separation would result in the inability to apply the adhesive and also poor adhesive performance. The closer are the solubility parameters of the different components are to each other, the greater the compatibility. See "Some Factors Affecting the Solubility of Polymers", by P. A. Small, J. Appl. Chem., 3, February 1953 (which teaches how to predict solubility parameters).

The cloud point temperature is the temperature at which a component begins to solidify or "cloud up" as it cools from a clear liquid phase to the solid phase. For example, for waxes, the cloud point is usually close to the melting point of the wax. Compatibility is related to cloud point temperature, where generally, the lower the cloud point temperature, the greater the compatibility. See "Adhesives and Coatings Manual" by National Distillers and Chemical Corporation (1983).

Most hot melt adhesive formulations utilize polymer resins having a low vinyl acetate content due to its lower cost relative to high vinyl acetate content polymers. Low vinyl acetate polymers are relatively non polar and can be formulated with other relatively non-polar tackifiers and waxes to yield compatible formulations. The commonly used waxes are non polar and can be formulated into compatible adhesives with low vinyl acetate containing polymer; these waxes include various grades of paraffin wax.

Higher vinyl acetate content polymer resins (>18% Vinyl acetate) are also used in hot melt adhesive formulations. The higher vinyl acetate content results in a stronger ionic bond to polar substrates such as paper, thereby creating a stronger adhesive. Vinyl groups are also known to modify polymer physical properties, making the composition more pliable and thereby increasing its adhesion performance, as known to those skilled in the art. The use of higher vinyl acetate content polymers requires formulating using more polar waxes and tackifiers to maintain formulation compatibility. These more polar waxes are generally more expensive than paraffin wax and the selection and supply of these more polar waxes is limited. Fischer-Tropsch ("FT") waxes are often used with higher vinyl acetate content polymer due to their better compatibility. From a supply standpoint however, Fischer-Tropsch waxes are not produced in the Americas. The two largest suppliers of FT waxes are Sasol from South Africa and Shell Oil from Malaysia; supplies of FT waxes are thus potentially subject to supply interruptions caused by world events.

Large oil companies such as Shell Oil, ExxonMobil and other oil refiners supply petroleum waxes used in these applications. Most of this wax is derived in the process of refining lube oil where the wax is separated from the lube oil stock and refined into various fractions of wax including paraffins, and microcrystalline waxes. Formulators such as Astor Wax, IGI and Moore & Munger also supply wax for these applications that is resold as is from the oil companies, and/or formulated and repackaged to meet the specific needs of customers.

A wax that is to be used in hot melt adhesives must have a relatively sharp melt point to yield an adhesive with a short 'set speed' and controllable open time. The melt point is another property in addition to compatibility. The wax must also allow for a reduction of overall adhesive viscosity to allow for the proper application or coating of the hot melt adhesive on the intended substrate. Generally, hot melt adhesive formulations are heated to 300–350 degrees F. prior to application in order to reduce viscosity. The wax must be stable at these temperatures to allow for extended periods as a molten product prior to application. It is well known to those versed in the art that stabilizers such as antioxidant (for example, hindered phenols) and free radical scavenger (such as, but not limited to, butylated hydroxy toluene "BHT", butylated hydroxyanisole "BHA", and Irganox 1010, supplied by Ciba Corp.) compounds can be added to the adhesive compound to further enhance thermal stability.

Synthetic ethylene vinyl acetate ("EVA") waxes have been developed and are commercially available for use with high vinyl acetate content polymer in adhesive formulations. Low molecular weight ethylene vinyl acetate waxes such as AC 400 (available from Honeywell); EVA1 (BASF); and MC400, available through Marcus Oil and Chemical, are examples of such commercially available materials. These waxes, however, are not widely used because of their relatively high cost to manufacture and resulting high selling price. These waxes also have relatively poor set speed characteristics when incorporated into adhesive formulations due to their low crystallinity and a lack of a sharp melting point.

Various attempts to utilize alternatives to imported and/or petroleum derived waxes have been reported (U.S. Pat. No. 4,749,739, U.S. Pat. No. 4,396,673 and U.S. Pat. No. 4,388,138; these patents are incorporated by reference herein).

For example, Foster, et al. (U.S. Pat. No. 4,749,739) discloses incorporation of a synthetic polyethylene wax, hydrocarbon tackifier and amorphous propylene polymer to create a low viscosity hot melt adhesive.

Ball, et al. (U.S. Pat. Nos. 4,396,673 and 4,388,138) mentions use of vegetable wax in combination with an isocyanate binder as a release agent in the manufacture of particleboard.

Mehaffy, et al (U.S. Pat. No. 6,117,945) highlights the need for low application temperature (between 200 to 300 degrees F.) hot melt adhesives and suggests a styrene, alpha-methylstyrene and/or vinyltoluene polymer combined with ethylene vinyl acetate polymer and paraffin wax.

The prior art thus illustrates the use of petroleum-derived waxes and synthetic waxes for formulating hot melt adhesive compounds. There are no mentions of vegetable derived triglyceride waxes for use in hot melt adhesive formulations, yet there is a recognized and long-felt need to find alternatives to products such as petroleum waxes that are derived from scarce and limited natural resources. There is also a recognized and long-felt need to use materials in hot melt adhesives that are considered safe to humans because of the adhesives' use in the manufacture of containers used to transport and store foodstuffs. There is also a recognized and long-felt need to use materials in hot melt adhesives that are naturally derived and can be easily recycled back into the environment without long-term adverse effects; corrugated cartons having wax-based coatings and adhesives, for example, are known to be difficult to recycle. Therefore, there is a need for employing a wax, which has similar properties of petroleum derived or synthetic waxes used in hot melt adhesive formulations. Due the large volume of waxes consumed in these applications it is also preferred that the compositions be readily available. From both a supply and a natural resource viewpoint, it is preferred that the compositions be obtained from a source that preferably is renewable, such as from plant extracts.

There is a need for a wax that is compatible with high vinyl acetate content polymer resins, has a sharp melting point, low viscosity, does not adversely affect adhesion and is thermally stable. It is also desirable to have a wax that does not have to be imported, and produced at a cost which is competitive with that of the paraffin and microcrystalline waxes. Given that the world's petroleum supply is finite, and dwindling, it is also desirable to have a wax that can be obtained from a renewable source, such as plants, rather than being petroleum based. Further, because hot melt adhesives are frequently used in food packaging applications, it is also desirable for the wax to have food grade properties for safety. The waxes of the present invention meet the rigorous requirements for this and other applications.

The present invention is a natural wax for use in hot melt adhesive formulations. The product is a commercially available high triglyceride wax derived from the processing of natural oil containing commodities such as soybeans, palm and other crops from which oil can be obtained. Hydrogenated vegetable oils are widely used in the food industry. Products of the present invention are highly hydrogenated to minimize un-saturation. Although commercially available, these materials are not widely produced or used due to their limited applications in the food industries. The materials are processed and supplied by Archer Daniels Midland (Decatur Ill.) designated by their product number 86-197-0, Cargill Incorporated (Wayzata, Minn.) designated by their product number 800mrcs0000u and other sources under a generic name 'hydrogenated soybean oil'. Palm oil wax was supplied by Custom Shortenings & Oils (Richmond, Va.) and was designated as their product Master Chef Stable Flake-P.

BRIEF SUMMARY OF THE INVENTION

It is an object of the present invention to provide a composition that can be incorporated into hot melt adhesive formulations.

Another object of the present invention is to provide an adhesive composition which can be subsequently applied to articles such as paper, paperboard and the like to bond them for use in consumer and other packaged goods applications.

It is an object of the present invention to provide a composition that can be incorporated into hot melt adhesive formulations as a substitute for petroleum-derived waxes currently used in such formulations.

Another object of the present invention is to provide a composition that when incorporated into hot melt adhesive formulations, is compatible with the other components of the formulations.

Still another object of the present invention is to provide a composition which when formulated into a hot melt adhesive, and which adhesive is applied to an article for the purpose of bonding that article to another article, the adhesive has adhesive performance characteristics similar to that of a conventional hot melt adhesive formulation prepared utilizing petroleum-derived wax.

Yet another object of the present invention is to provide a composition which can be derived from a renewable resource in place of non-renewable petroleum based compositions.

Still another object of the present invention is to provide a composition which can be derived from a renewable resource and which can be economically produced.

Another object of the present invention is to provide a composition for use in hot melt adhesives and for paper coating and have properties that are generally regarded as safe by the Food and Drug Administration.

The present inventors have unexpectedly discovered that highly hydrogenated oils such as palm and soybean can be converted into a wax that can be used effectively as substitutes for conventional petroleum and synthetic waxes in the formulation of hot melt adhesive compounds.

The present invention comprises a highly hydrogenated vegetable oil (derived from sources such as palm, soybean, corn or others) that has wax-like properties and can be formulated using conventional means with other components in the manufacture of hot melt adhesive compounds, to produce adhesive compositions which have adhesive characteristics similar to adhesive formulations containing petroleum derived wax. The inventive waxes consists essentially of a hydrogenated oil that comprises >90% triglyceride, and whose fatty acid components have a range of carbon numbers, with stearic acid ($C_{18}$), being the most predominant (>50%). The wax compositions have a low iodine value (between 2–5), and melting points between approximately 120–165 degrees F. (Mettler Drop Point). The wax compositions of the present invention can also be used as an additive (as a coating) in the manufacture of wax coated boxes, which can then be recycled more readily than boxes prepared using conventional waxes.

DETAILED DESCRIPTION OF THE INVENTION

The present invention is a wax composition, derived from compounds of plant origin, which can be used as an alternative to petroleum derived wax in formulating hot melt adhesives that are subsequently used to bond articles, yet which composition yields adhesive properties similar to adhesives containing petroleum derived waxes.

As known in the art, triglycerides are fatty acid esters of glycerol. As used herein, the term "free fatty acid" will refer to a fatty acid that is not covalently bound through an ester linkage to glycerol. Additionally, as used herein, the term "fatty acid component" will be used to describe a fatty acid that is covalently bound through an ester linkage to glycerol.

Naturally occurring carboxylic acids ("fatty acids") and their derivatives, most commonly the glyceryl derivatives in which all three hydroxy groups of the glycerol molecule are esterified with a carboxylic acid, are used commercially. The carboxylic acids may be saturated or unsaturated. The tri-substituted glycerols (triglycerides, also referred to as triacylglycerols) are major components of most animal and plant fats, oils and waxes. When all three hydroxy groups of a glycerol molecule have been esterified with the same fatty acid, it is referred to as a monoacid triglyceride. Whether one refers to triglycerides as "waxes," "fats," or "oils" depends upon the chain lengths of the esterified acids and their degree of saturation or unsaturation as well as the ambient temperature at which the characterization is made. Generally, the greater the degree of saturation and the longer the chain length of the esterified acids, the higher will be the melting point of the triglyceride.

Naturally occurring and synthetic waxes are extensively used in a wide cross-section of industries including the food preparation, pharmaceutical, cosmetic, and personal hygiene industries. The term wax is used to denote a broad class of organic ester and waxy compounds, which span a variety of chemical structures and display a broad range of melting temperatures. Often the same compound may be referred to as either a "wax," "fat" or an "oil" depending on the ambient temperature. By whatever name it is called, the choice of a wax for a particular application is often determined by whether it is a liquid or solid at the temperature of the product with which it is to be used. Frequently it is necessary to extensively purify and chemically modify a wax to make it useful for a given purpose. Despite such efforts at modification, many of the physical characteristics of waxes still prevent them from being used successfully or demand that extensive, and oftentimes, expensive, additional treatments be undertaken to render them commercially useable.

Many commercially utilized triglycerides and free fatty acids are obtained preferably from plant sources, including soybean, cottonseed, corn, sunflower, canola and palm oils. The triglycerides are used after normal refining processing by methods known in the art. For example, plant triglycerides may be obtained by solvent extraction of plant biomass using aliphatic solvents. Subsequent additional purification may involve distillation, fractional crystallization, degumming, bleaching and steam stripping. The triglycerides obtained are partially or fully hydrogenated. Furthermore, fatty acids may be obtained by hydrolysis of natural triglycerides (e.g., alkaline hydrolysis followed by purification methods known in the art, including distillation and steam stripping) or by synthesis from petrochemical fatty alcohols. The free fatty acids and triglycerides may further be obtained from commercial sources, including Cargill, Archer Daniels Midland, Central Soya and other suppliers.

In the present invention. the free fatty acids and fatty acid components of the triglycerides are preferably saturated, and have various chain lengths. The free fatty acids and fatty acid components of the triglycerides may be unsaturated, provided that the coating composition will be a solid at the temperature at which the coating is used. The properties of the free fatty acid/triglyceride mixture, such as melting point, varies as a function of the chain length and degree of saturation of the free fatty acids and the fatty acid components of the triglycerides. For example, as the degree of saturation decreases, the melting point decreases. Similarly, as the chain length of the fatty acids decreases, the melting point decreases. Preferred free fatty acids are saturated fatty acids, such as palmitic acid, and other saturated fatty acids having longer carbon chain lengths, such as arachidic acid and behenic acid. Stearic acid is further preferred.

The iodine value ("I.V."), also referred to as the iodine number, is a measure of the degree of saturation or unsaturation of a compound. The iodine value measures the amount of iodine absorbed in a given time by a compound or mixture. When used in reference to an unsaturated material, such as a vegetable oil, the IV is thus a measure of the unsaturation, or the number of double bonds, of that compound or mixture.

Vegetable oils or animal fats can be synthetically hydrogenated, using methods known to those skilled in the art, to have low or very low iodine values. Fats naturally composed primarily of saturated triglycerides (such as palm oil or fractionated fats) can be used alone or in blend formulations with adhesives/laminants to achieve an enhanced water tolerance for composite materials (U.S. Pat. No. 6,277,310). The major components of plant oils are triacylglycerols.

Saturated triglycerides having a low iodine value (a range of iodine values of about 0–70 with 0–30 preferred) may be produced by hydrogenation of a commercial oil, such as oils of soybean, soy stearine, stearine, corn, cottonseed, rape, canola, sunflower, palm, palm kernel, coconut, crambe, linseed, peanut, fish and tall oil; or fats, such as animal fats, including lard and tallow, and blends thereof. These oils may also be produced from genetically engineered plants to obtain low IV oil with a high percentage of fatty acids.

Fats are commonly fractionated by a process known as "winterization", wherein the mixture is chilled for a period of time which is long enough to allow the harder fractions of the fats to crystallize. This chilling is followed by filtration, with the harder fractions being retained on a filter cake. These harder fractions have a lower iodine value and, therefore, a melting point that is higher than the melting point of the fat from which it has been separated. Hence, winterization can be used as a source for lower IV fats.

The winterization process is generally used to fractionate animal fats, and can thus produce a variety of animal fat fractions, having differing iodine values and consequently, differing chemical properties. These fractions can be blended with fatty acids and free fatty acids obtained from other sources, such as plant or vegetable extracts referred to above, and these blends can also be used in the present invention.

The present invention performs best with a hydrogenated triglyceride where the iodine value is close to zero thereby rendering the triglyceride more thermally stable. The triglycerides can be chosen from those having an iodine value of between 0–30, but a triglyceride having an iodine value of between 2–5 is preferred.

Adhesives generally comprise a wax, a tackifying agent and a polymeric resin. When an adhesive is applied to a substrate, such as, for example only, paper or other cellulose based products, and the substrates joined to each other, the adhesive serves to bond the substrates together. Hot melt adhesives are routinely used in the manufacture of corrugated cartons, boxes and the like. They are also used in diverse areas, such as bookbinding; sealing the ends of paper bags; furniture manufacturing; and adhering other articles, such as glass, metals and various plastics, including attaching paper labels to plastic containers. Additional uses of hot-melt adhesives include, but are not limited to, carpet seam sealing tape, lamination, product assembly, nonwoven construction, and potting and encapsulation compounds. For the manufacture of corrugated cartons, especially those used for shipping refrigerated or frozen foods, or for shipping foods packed in ice, hot melt adhesives are generally selected because of their ability to maintain a strong bond under the difficult conditions, such as stress and shock in handling, high humidity and variations in the environmental temperature. The wax component of adhesives affects properties such as its setting speed and thermal stability.

Prior art hot-melt adhesive compositions generally utilize waxes derived from petroleum products, and include the paraffins and microcrystalline waxes described previously Oxidized polyethylene waxes, also derived from petroleum products, may be used. Additionally, Fischer-Tropsch waxes can be utilized, but they are not preferred because of their having to be imported and their generally higher cost compared to the petroleum-derived waxes.

The ratio of polymer to tackifier to wax is generally specific to a particular application's need. In general, the percent wax is minimized and added in sufficient quantities to achieve desired viscosity and set speeds. The level of wax is generally in the range of approximately 15% to approximately 75% by weight of the formulation. The waxes employed in most hot melt adhesive compositions are waxes which are derived from petroleum, such as the paraffins and microcrystalline waxes. Preferably, the level of wax in the formulation is in the range of approximately 25%–approximately 35% by weight of the formulation. More preferably, the level of wax in the formulations of the present invention is in the range of approximately 3-%–approximately 35% by weight of the formulation.

The tackifier allows the polymer to be more adhesive by improving wetting during the application. Tackifying agents are added to give tack to the adhesive and also to lower viscosity. Tack is required in most adhesive formulations to allow for proper joining of articles prior to the hot melt adhesive solidifying. Effective tackifiers include: glycerol and pentaerythritol esters of natural and chemically modified rosins; naturally occurring and chemically modified resins, such as wood rosin, gum rosin, tall oil rosin, distilled rosin, and rosins modified by processes such as polymerization, hydrogenation, maleation and dimerization; polyterpene resins; modified terpene resins, such as chlorinated terphenyl resins and phenolic-modified terpene resins; and aliphatic petroleum hydrocarbon resins, such as those resulting from polymerization of olefin and diolefin monomers Tackifiers added to hot-melt adhesives can be characterized by parameters such as their softening points, specific gravities, or by acid number. A tackifier can be selected from among the variety of tackifiers, as described above but not limited thereto, and from tackifiers characterized by a range of acid numbers, such as acid numbers between 3 and 100, more preferably between 3 and 25, and most preferably a tackifier having an acid number between 3–10. The tackifier can be used in amounts ranging from approximately 2% by weight to approximately 70% by weight. The tackifier is preferably used in amounts between approximately 15% by weight to approximately 40% by weight, and more preferably in amounts ranging from approximately 30% to approximately 35% by weight in the present invention. is typically necessary in preferred compositions.

In the composition of the present invention, a preferred tackifying agent is FORAL® 85 (Hercules, now available from Eastman). This agent is a hydrogenated glycerol ester, with a softening point between 80–88 degrees C., and characterized by having a specific gravity of 1.07 at 25 degrees, C., and an acid number ranging from 3–10 (Table 3).

The copolymer can be selected from one or more reagents, such as copolymers of ethylene; or copolymers of ethylene and vinyl acetate (ethylene-vinyl acetate, "EVA"). The copolymer can be chosen from the group consisting of, but not limited to, ethylene acrylic acid copolymers, ethylene ethyl acrylate copolymers; ethylene methacrylic acid copolymers; ethylene vinyl acetate terpolymers and other copolymers derived from ethylene, such as polyamides, polyethylene, polyesters, and polypropylenes; natural or synthetic rubbers, including styrene-isoprene and styrene-butadiene random and block copolymers, polyvinyl acetate and vinyl acetate/unsaturated carboxylic acid copolymers, polyvinyl acetals, polyurethanes and ethyl cellulose.

In the present invention, the copolymer is selected from the ULTRATHENE® (trademark of Equistar Chemicals, Houston Tex.) group of polymers. The ULTRATHENE®s are described as ethylene vinylacetate copolymers, whose relevant properties are listed in Table 3. ULTRATHENE® UE 612-04 comprises 18% vinyl acetate, and ULTRATHENE® UE 646-04 comprises 28% vinyl acetate. The copolymer is used in the adhesive compositions of the present invention in concentrations ranging from approximately 5% by weight to approximately 50% by weight of the composition. The coolymer can more preferably be used at concentrations ranging from about 25% to about 35% by weight of the composition, and is most preferably employed at concentrations from about 30% to about 35% by weight of the composition (Table 4).

The adhesives of the present invention preferably also contain a number of additional components, such as a stabilizer, plasticizer, filler or antioxidant. Among the applicable stabilizers or antioxidants which can be included in the adhesive composition of the present invention are high molecular weight hindered phenols and multifunctional phenols, such as sulfur-containing and phosphorous-containing phenols. Hindered phenols, known to those skilled in the art, may be described as phenolic compounds, which also contain sterically bulky radicals in close proximity to the phenolic hydroxyl group. Specifically, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity. It is this hindrance that provides the stabilizing properties of these phenolic compounds.

Representative hindered phenols include; but are not limited to:

2,4,6-trialkylated monohydroxy phenols; 1,3,5-trimethyl-2,4,6-tris-(3,5-di-tert-butyl-4-hydroxybenzyl)-benzene; pentaerythritol tetrakis-3(3,5-di-tert-butyl-4-hydroxyphenyl)-propionate, commercially available under the trademark IRGANOX® 1010; n-octadecyl-3(3,5-di-tert-butyl-4-hydroxyphenyl)-propionate; 4,4'-methylenebis (4-methyl-6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; 2-(n-octylthio)ethyl 3,5-di-tert-butyl-4-hydroxy-benzoate; di-n-octadecyl 3,5-di-tert-butyl-4-hydroxy-benzylphosphonate; and sorbitol hexa[3,3,5-di-tert-butyl-4-hydroxy-phenyl)-propionate.

Antioxidants include, but are not limited to, butylated hydroxy anisole ("BHA") or butylated hydroxy toluene ("BHT") which may also be utilized to render the formulation more thermally stable These stabilizers and antioxidants are added in amounts ranging approximately 0.01% to approximately 5% by weight of the formulation.

The performance of these antioxidants may be further enhanced by utilizing known synergists in conjunction with the antioxidants. Some of these known synergists are, for example, thiodipropionate esters and phosphates. Chelating agents and metal deactivators, may also be used. Examples of these compounds include ethylenediaminetetraacetic acid ("EDTA"), and more preferably, its salts, and disalicylalpropylenediimne. Distearylthiodipropionate is particularly useful. When added to the adhesive composition, these stabilizers, if used, are generally present in amounts of about 0.1 to about 1.5 weight percent, and more preferably in the range of about 0.25 to about 1.0 weight percent.

The present invention also contemplates the addition of a polymeric additive to the adhesive. The polymeric additive can be selected from the group consisting of ethylene methyl acrylate polymers containing 10 to 28 weight percent by weight methyl acrylate; ethylene acrylic acid copolymers having an acid number of 25 to 150; polyethylene; polypropylene; poly(butene-1-co-ethylene) polymers and low molecular weight and/or low melt index ethylene n-butyl acrylate copolymers. When such a polymeric additive is added, it is present in amounts up to about 15 weight percent by weight of composition.

Depending on the contemplated end uses of the adhesive composition, other additives such as plasticizers, pigments and dyestuffs that are conventionally added to hot-melt adhesives may be included. In addition, small amounts of additional (secondary) tackifiers and/or waxes such as microcrystalline waxes, hydrogenated castor oil and vinyl acetate modified synthetic waxes may also be incorporated in minor amounts, i.e., up to about 10 weight percent by weight, into the formulations of the present invention. A plasticizer may be used in lieu of, or in combination with, the secondary tackifier to modify viscosity and improve the tack properties of the adhesive composition.

A dispersant can also be added to these compositions. The dispersant can be a chemical, which may, by itself, cause the composition to be dispersed from the surface to which it has been applied, for example, under aqueous conditions. The dispersant may also be an agent which when chemically modified, causes the composition to be dispersed from the surface to which it has been applied. As known to those skilled in the art, examples of these dispersants include surfactants, emulsifying agents, and various cationic, anionic or nonionic dispersants. Compounds such as amines, amides and their derivatives are examples of cationic dispersants. Soaps, acids, esters and alcohols are among the known anionic dispersants. The addition of a dispersant may affect the recyclability of products to which a hot-melt adhesive may been applied.

The surfactants can be chosen from a variety of known surface-active agents. These can include nonionic compounds such as ethoxylates available from commercial suppliers. Examples include alcohol ethoxylates, alkylamine ethoxylates, alkylphenol ethyoxylates, octylphenol ethoxylates and the like. Other surfactants, such as a number of fatty acid esters may be employed; for example, but not limited to, glycerol esters, polyethyleneglycol esters and sorbitan esters.

The present invention is a natural wax for use in hot melt adhesive formulations. The product is a commercially available high triglyceride wax derived from the processing of natural oil-containing commodities such as soybeans, palm and other crops from which oil can be obtained. The waxes used in the present invention are a palm oil wax and a soybean wax, prepared from hydrogenated oil. The materials are processed and supplied by Archer Daniels Midland (Decatur Ill.) designated by their product number 86-197-0; Cargill Incorporated (Wayzata, Minn.) designated by their product number 800mrcs0000u; and other sources under a generic name 'hydrogenated soybean oil'. Palm oil wax was supplied by Custom Shortenings & Oils (Richmond, Va.) and was designated as their product Master Chef Stable Flake-P. The soybean was is also distributed by Marcus Oil and Chemical Corp., Houston, Tex. under the designation Marcus Nat 155; these waxes can also be used as food additives.

Generally, the vegetable-derived waxes that can be employed in the present invention have melting points that are in the range of between about 130 degrees F. to about 180 degrees F.

The properties of the two waxes are summarized in Tables 1 and 2, where it can be seen that these waxes have IV's of between 5 and 2, respectively.

The soybean oil wax has a melting point, as measured by Mettler Drop Point, of between 155–160 degrees F., while that of the palm oil wax is between 136–142 degrees F.

These waxes are further characterized by having a viscosity of between 10–200 cps at a temperature of 210 degrees F., Each wax comprises 98% triglyceride by weight with trace amounts of fatty acids. The triglyceride can be saponified through the addition of a base such as KOH to yield a saponification value. Saponification values will vary depending mainly upon the chain length of the fatty acids, which is a function of the source from which the vegetable wax was derived. For the hydrogenated soy and palm waxes used in the present invention, the saponification (SAP) value is in the range of 180–200 mg KOH/g.

When the waxes were analyzed for their fatty acid content using known methods of Gas Liquid Chromatography ("GLC"), the soybean wax was found to comprise between 82–94% stearic acid ($C_{18:0}$) and between 3–14% palmitic acid ($C_{16:0}$). By comparison, the palm oil wax comprises approximately 55% stearic acid ($C_{18:0}$), 39.5% palmitic acid ($C_{16:0}$), 1.1% myristic acid ($C_{14:0}$) and approximately 1.0% oleic acid ($C_{18:1}$).

The adhesive compositions of the present invention can be utilized for adhering corrugated carton members to each other, for adhering paper and other items manufactured from cellulosic fibers, for use in furniture manufacturing, plastics manufacturing, and adhesion of paper substrates to items such as other paper items, corrugated materials, kraft paper and the like, linerboard, glass and plastic items Although the present invention has been described with a certain degree of particularity, it is to be understood that the examples below are merely for purposes of illustrating the present invention, the scope of the present invention intended to be defined by the claims.

PREPARATION OF EXAMPLES

Example 1

Preparation and Evaluation of Adhesive Formulations

For the purpose of illustrating the invention, evaluations were conducted to determine the performance of wax material versus a 'control' petroleum derived microcrystalline wax in standard hot melt EVA formulations.

The following materials were used to make the EVA adhesive formulations.

1. EVA resin with 18% VA content, ULTRATHENE® 612-04 made by Equistar Chemical, LP.
2. EVA resin with 28% VA content, ULTRATHENE® 646-04 made by Equistar Chemicals, LP.
3. Rosin Ester tackifier, FORAL® 85 made by Hercules.
4. Microcrystalline Controll Wax, 1251/7 supplied by Frank B. Ross Co.
5. Thermal stabilizer IRGANOX® 1010 made by Ciba-Geigy.

The compositions of the formulations used are in Table 4; the ingredients were added on a weight basis, and were designated as either "High VA" (indicating the use of the 28% EVA content resin), or "Low VA" (indicating the use of the 18% EVA content resin). Ingredients were blended in a quart can heated by a glass-heating mantle. Tackifier resin and Anti-oxidant were added into the can and allowed to heat for 10 minutes. Mixing was started at a moderate rate of speed while the EVA was slowly added over 25 minutes. While mixing continued the wax was slowly added over a 15-minute period into the adhesive. The adhesive was allowed to mix an additional 15 minutes to assure uniformity. The final adhesive temperature was 350–360 degrees F.

Example 2

Compatibility Testing of Waxes with Adhesive Formulation Components

To determine whether the waxes were compatible with the other components of the hot melt adhesive formulations, 25 grams of adhesive were placed into a 4-ounce glass jar. The jar was placed in an oven at 350 degrees F. and the adhesive examined visually every half hour for 2 hours for evidence of phasing or incompatibility. The results showed that after 2 hours at 350 degrees F., the adhesive formulations were crystal clear and uniform in appearance, indicating that the soy and palm waxes were compatible with the other components of the adhesive formulations, in formulations having high and low VA content.

Example 3

Adhesive Properties of the Inventive Formulations

To evaluate the adhesive properties of the inventive formulations, the hot melt formulations were coated onto 56# basis weight paper typically used in the manufacture of cardboard boxes. The formulations were coated at both 5 and 10 mil thickness.

Coatings were made using a wet film applicator (Bird type) with a 5 or 10 mil gap. The adhesive composition, the 4 inch wide applicator and sheets of ½ inch thick plate glass were placed into an oven for equilibration. After the appropriate time interval, the glass was removed from the oven and strips of the 56# basis weight paper, were placed onto the glass. A volume of the specific coating was placed at one end of the paper, the applicator applied to the paper and the hot molten adhesive drawn by hand to coat the paper. Equivalent coating weights were calculated as 73 g/1000 square feet for the 5 mil coating, and 146 g/1000 square feet for the 10 mil coating.

Example 3A

Open Time

Open time evaluations were conducted on the adhesive formulations according to the ASTM D-4497 test procedure.

Figure 1:
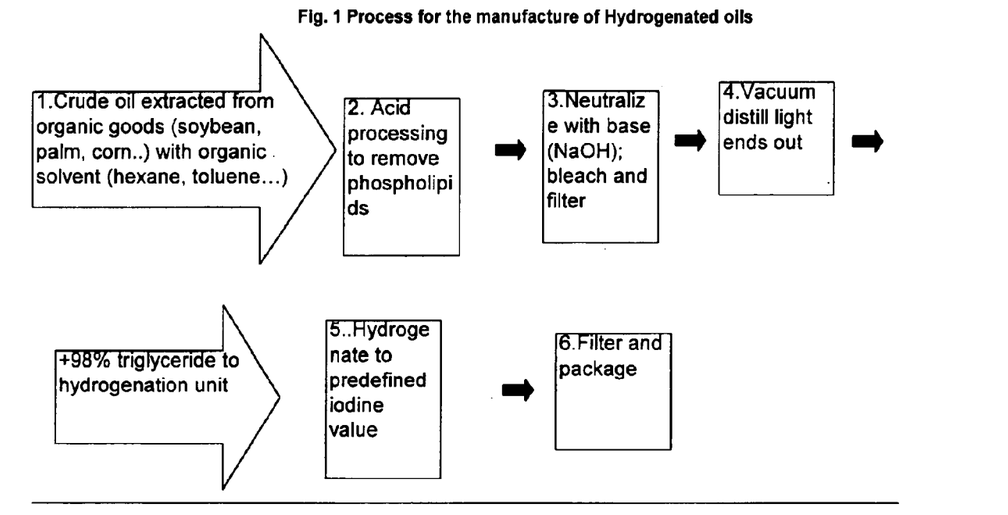
FIG. 1 is a flow chart illustrating a process for the manufacture of hydrogenated oils.
Figure 2:
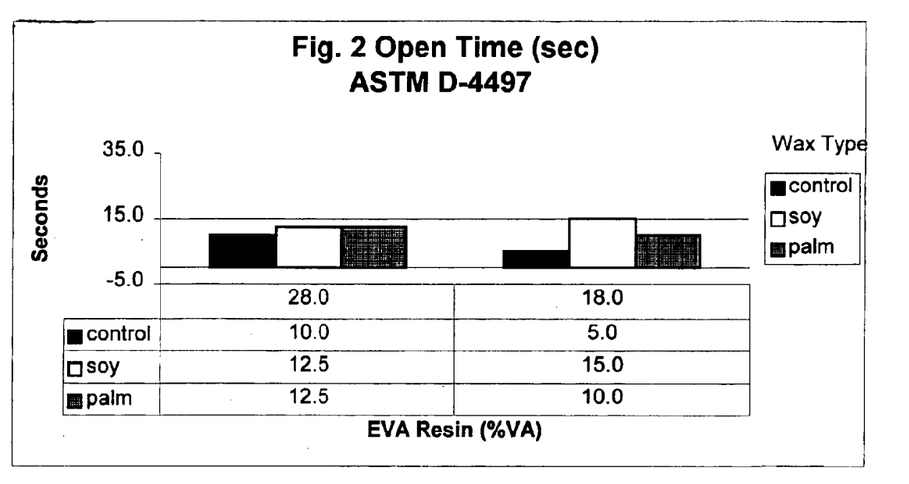
FIG. 2 illustrates the open time parameter of adhesive of adhesive formulations of the present invention.

For this evaluation, a 10 mil thick layer of each formulation is coated onto 56# basis weight paper, and 1×4 inch strips of standard kraft paper (1810A) was laid onto the warm adhesive at timed intervals ranging from 0, 5, 10, 15, 20 and 25 seconds. Following complete cooling, the strips were removed, and the removed strips evaluated for the degree of paper tearing. If greater than 50% paper tear was evident, the hot melt was considered 'open'. The results (FIG. 2) indicated that the open time for both the soy and palm wax formulations was slightly longer than the open time for the control. This can be advantageous for applications where there needs to be some time allowed before the articles are bonded. In other applications a change in the formulation (i.e. more wax or the addition of a small quantity of higher melting wax) can result in matching the open time of the control formulation.

Example 3B

Viscosity

Figure 3:
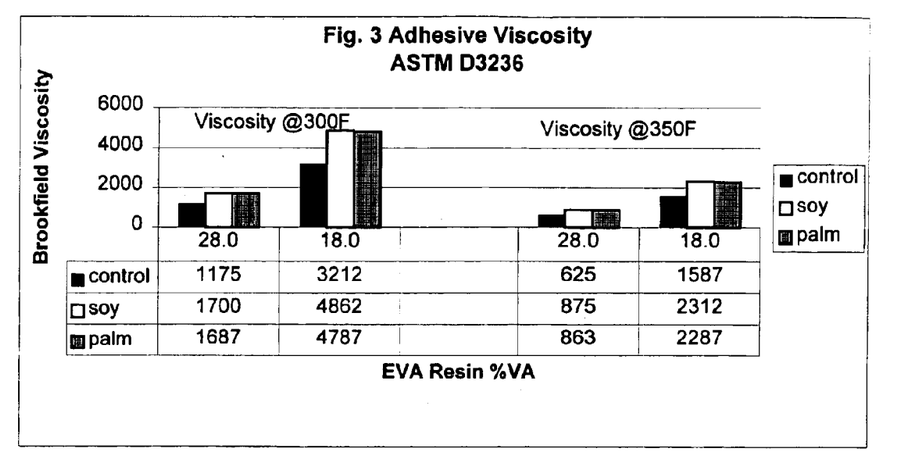
FIG. 3 illustrates the viscosity of adhesive formulations of the present invention.

The adhesive formulations were evaluated for viscosity by using a Brookfield Viscosity measurement device according to ASTM test method D3236. Formulations were analyzed using a Brookfield LVDV II+ viscometer, HT-2 Sample Chamber and a number 27 spindle with a rotation speed of 20 rotations per minute. A sample chamber was filled with 10.5 grams of each formulation and then placed into the Thermosel that had been preheated to 300 degrees F. and allowed to stabilize for 10 minutes. After the sample chamber had come to temperature the spindle was inserted. When the spindle was in place, the sample was given 30 minutes to equilibrate, and the first viscosity was measured at 300 degrees F. The temperature was then increased to 350 degrees F. and the final viscosities were recorded after 30 minutes at 350 degrees F. The results (FIG. 3) indicate that both the soy and palm wax viscosity were slightly higher than that of the control, but are still within acceptable limits for hot melt adhesives.

Example 3C

Peeling Test

The T-peel test is a standard test method for measuring adhesive performance, and is familiar to those skilled in the art. Briefly, the extent of paper tearing is a measure of adhesion; the greater the force needed to achieve a tear, the stronger the bond. To evaluate the adhesive properties of the present invention, a standard T-Peal test method (ASTM D-1876) was utilized. T-peel testing was performed on a ChemInstruments TT-1000 Tensile Tester. The results show that there was paper tear for all samples except for the palm oil high EVA content formulation. Paper tear indicates good bonding and the actual value is a function of the strength of the adhesive bond. For these tests paper tear values ranged from 12 to 15 oz/in.

Example 3D

Shear Adhesion Failure Temperature Test

Figure 4:
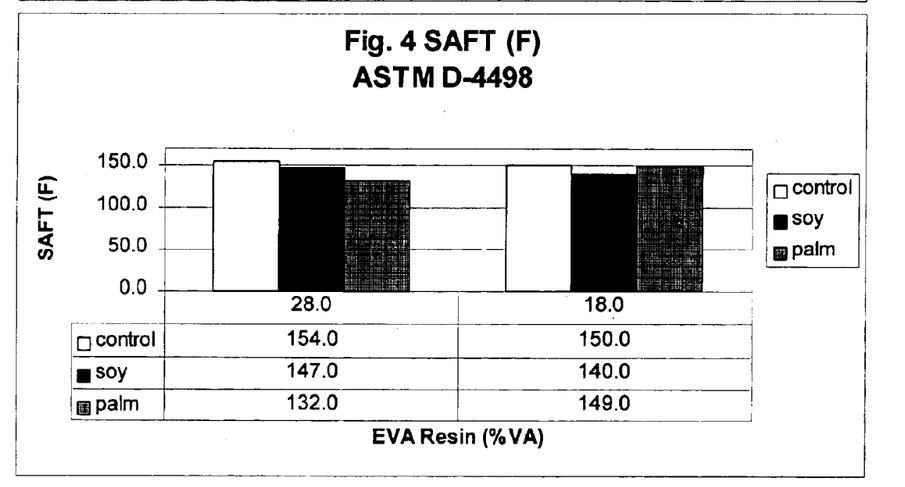
FIG. 4 compares the adhesive properties of the present invention with a control hot melt adhesive, using the Shear Adhesion Failure Test ("SAFT").
Figure 5:
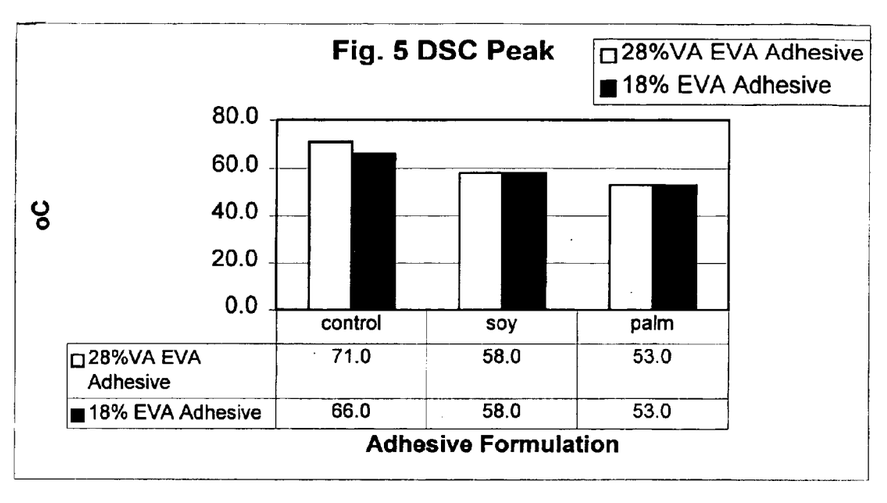
FIG. 5 illustrates the melting points of adhesive formulations of the present invention, as determined by Differential Scanning Calorimetry.

The Shear Adhesion Failure Temperature ("SAFT") test is another commonly used test to evaluate adhesive performance, and well known to those versed in the industry. The SAFT test measures the temperature at which an adhesive fails. The formulations of the present invention were evaluated using a standard SAFT test method (ASTM D-4498). SAFT tests were run using a ChemInstruments HT-8 Oven Shear Tester. The tests were started at room temperature (25° C./77° F.) and the temperature increased at the rate of 0.5 degrees C./min. The results were converted and reported in degrees F. (FIG. 4). The SAFT values for both the soy and palm wax formulations were slightly lower than the control formulation, but this is to be expected given the lower melting points of the palm and soy wax relative to the control wax Example 3E Adhesive Parameter: Melting Point To measure the melting points of the adhesive formulations of the present invention a technique called Differential Scanning Calorimetry ("DSC") was utilized, a method commonly used to determine the melting point of various substances. DSC measures the heat flow into a substance as a function of sample temperature. An exothermic transition is noted by absorption of energy while an endothermic transition is when a substance gives off energy. A few milligrams of sample are placed into the instrument and the temperature is then increased from 0 degrees C. to a desired temperature at the rate of 10 degrees C./min. The thermogram results are plotted as watts/gram (energy) versus temperature. An exothermic (i.e. melting or sublimation) transition will show as a positive peak. The results of this test are shown in FIG. 5, where it can be seen that the melting points of formulations containing the soy and palm wax were lower than the melting point of the control formulation, regardless of vinyl acetate content.

TABLE 1

Typical properties of Hydrogenated Soybean Oil (Archer Daniels Midland (Decatur Ill.) designated by their product number 86-197-0)

| Property | Typical analysis |
|---|---|
| Lovibond Red Color | 2.0 max |
| Saponification | 180 mgKOH/g |
| Viscosity | 60SUS @ 210 F. |
| Hardness (needle penetration) | 2 dmm @ 77 F. |
| % FFA Max.* | 0.10 max |
| Flavor Min. | Characteristic |
| P.V. Mil eq/kg/max. | 1.0 max |
| F.I. min** | 8.0 min |
| Specific gravity (H2O = 1) | 0.92 |
| % Moisture max. | 0.05 max |
| I.V. by R.I. | 2.0 max |
| Iron (ppm) | 0.3 max |
| Soap (ppm) | 3.0 max. |
| Nickel (ppm) | 0.02 max |
| Copper (ppm) | 0.05 max. |
| Phosphorous (ppm) | 15.0 Max |
| Residual Citric Acid (ppm) | 15.0 max |
| Mettler Drop Point (F) | 155–160 |
| Typical Fatty Acid Composition (by GLC) | |
| C 14:0*** | 3.0 max |
| C 16:0 | 3–14 |
| C 18:0 | 82–94 |
| C 20:0 | 5 max |

*FFA: Free Fatty Acids.
**F.I.: FlavorIndex
***number of carbon atoms:number of double bonds (e.g., 18:2 refers to linoleic acid palmitic acid (16:0), stearic acid (18:0), oleic acid (18:1), arachidic acid (20:0) and behenic acid (22:0)

TABLE 2

Typical properties of Hydrogenated Palm Oil
(Custom Shortenings & Oils (Richmond, Va) product Master Chef Stable Flake-P.)

| Property | Typical analysis |
|---|---|
| Lovibond Red Color | 4.0 max |
| % Free Fatty Acids Max. | 0.10 max |
| Flavor Min. | Bland |
| Iodine Value. by R.I. | 5.0 max |
| Mettler Drop Point (F) | 136–142 |
| Saponification | 185 mgKOH/g |
| Viscosity | 65 SUS @ 210 F. |
| Hardness (needle penetration) | 2–3 dmm @ 77 F. |
| Typical Fatty Acid Composition (by GLC) | |
| C 8:0* | 0.3% max |
| C 10:0 | 0.3 max |
| C 12:0 | 0.5% max |
| C 14:0 | 1.1% max |
| C 16:0 | 39.5% min |
| C 18:0 | 53.0% min |
| C 18:1 | 1.0% max |
| C 18:2 | 0.5% max |

*number of carbon atoms:number of double bonds (e.g., 18:2 refers to linoleic acid

TABLE 3

Properties of Other Materials Used in Compositions

| Ingredient | Property | Nominal Value | Units | Test Method |
|---|---|---|---|---|
| Ultrathene ® UE 612-04* | Equivalent melt index | 150 | G/10 min | ASTMD1238 |
| | Vinyl acetate content | 18 | % | ETM 15 A (FTIR) |
| | Viscosity @ 150 C. (302 F.) | 105,000 | CP | ASTM D3236 |
| | Density | 0.94 | G/cc | ASTM D1505 |
| | Peak Melt Point | 82/180 | ° C./° F. | ASTM D3418 |
| Ultrathene ® UE 646-04* | Equivalent melt index | 25 | G/10 min | ASTMD1238 |
| | Vinyl acetate content | 28 | % | ETM 15 A (FTIR) |
| | Viscosity @ 150 C. (302 F.) | 580,000 | CP | ASTM D3236 |
| | Density | .95 | G/cc | ASTM D1505 |
| | Peak Melt Point | 70/158 | ° C./° F. | ASTM D3418 |
| Ross Microcrystalline Wax 1251/7** | Melting Point | 150–150 | ° F. | ASTM D3954 |
| | Needle Penetration | 10–15 | dmm | ASTM D1321 |
| Foral ®85 Synthetic Resin*** | Softening Point | 80–88 | ° C. | Hercules Method |
| | Acid Number | 3–10 | Mg KOH/g | |
| | Specific Gravity | 1.07 | @ 25° C. | |

*Equistar Chemicals, Houston Tx
**Frank Ross Co, Inc, Jersey City, NJ
***Hercules Corp, Wilmington, DE

TABLE 4

Composition of Hot-Melt Adhesive Formulations (all units in grams)

| | Control | SOY WAX | PALM WAX |
|---|---|---|---|
| High VA Content Formulations (28% VA in resin) | | | |
| EVA (28% VA) | 200 | 200 | 200 |
| Tackifier (FORAL 85) | 200 | 200 | 200 |
| Wax-control | 200 | | |
| Wax-soy | | 200 | |
| Wax-palm | | | 200 |
| Thermal stabilizer | 6 | 6 | 6 |
| Low VA Content Formulations (18% VA in resin) | | | |
| EVA (18% VA) | 200 | 200 | 200 |
| Tackifier (FORAL 85) | 200 | 200 | 200 |
| Wax-control | 200 | | |
| Wax-soy | | 200 | |
| Wax-palm | | | 200 |
| Thermal stabilizer | 6 | 6 | 6 |

We claim:

1. A hot-melt adhesive composition, the adhesive composition comprising:
   (a) from about 25% to about 35% by weight of a thermoplastic copolymer consisting essentially of an ethylene containing copolymer, the copolymer being selected from the group consisting of an ethylene copolymer, an ethylene vinyl acetate copolymer, and copolymers and terpolymers thereof, the copolymer having a vinyl acetate content from about 18% to about 28%, the copolymer having a melt viscosity of from about 100,000–about 600,000 cP at 302 degrees F.;
   (b) from about 15% to about 40% by weight of a tackifier resin, the tackifier resin being characterized by having an acid number of from about 3 to about 10;
   (c) from about 15 –about 35% by weight of a wax derived from a hydrogenated vegetable oil (a vegetable derived wax), the wax being characterized by having a melt viscosity of from about 50 to about 70 SUS at 210 degrees F., and a Mettler drop point of from about 130 degrees to about 170 degrees F.; and
   (d) the adhesive composition being characterized by having a DSC melt point of from about 50 degrees C. to about 80 degrees C., and a melt viscosity of from about 1000–about 5000 cps at 350 degrees F., the adhesive composition being capable of binding a fibrous cellulosic article to an article selected from the group consisting of a fibrous cellulosic article, wood, metal, glass and plastic.

2. The adhesive as described in claim 1, wherein the vegetable derived wax is selected from the group consisting of soybean, corn, cottonseed, rape, canola, sunflower, palm, palm kernel, coconut, crambe, linseed and peanut wax.

3. The composition as described in claim 2, wherein the vegetable derived wax is derived from soybean.

4. The composition as described in claim 2, wherein the vegetable derived wax is derived from palm.

5. The adhesive as described in claim 2, wherein the adhesive composition is further characterized by having a DSC melting point which is preferably from about 53 degrees to about 58 degrees C.

6. The adhesive as described in claim 2, wherein the wax more preferably comprises from about 25%–about 35% by weight of the composition.

7. The adhesive as described in claim 6, wherein the wax most preferably comprises from about 30%–about 35% by weight of the composition.

8. The adhesive as described in claim 2, wherein the copolymer preferably comprises from about 30% to about 35% by weight of the composition.

9. The adhesive as described in claim 1, wherein the fibrous cellulosic article is chosen from the group consisting of corrugated paper, kraft paper, linerboard and paper.

10. The adhesive as described in claim 9, further comprising one or more compounds chosen from the group consisting of stabilizers, plasticizers, fillers, antioxidants, preservatives, synergists, dyes, pigments, and waxes.

11. A hot-melt adhesive composition, the adhesive composition comprising:

(a) from about 25% to about 35% by weight of a thermoplastic copolymer selected from the group consisting of a copolymer consisting essentially of an ethylene containing copolymer or a copolymer consisting essentially of an ethylene vinyl acetate ("EVA") copolymer, ethylene acrylic acid copolymers, ethylene ethyl acrylate copolymers; ethylene methacrylic acid copolymers; ethylene/vinyl acetate/acid terpolymers, polymers derived from ethylene, polyamides, polyethylene, polyester, and polypropylene;

(b) from about 15% to about 40% by weight of a tackifier resin, the tackifier selected from the group consisting of a rosin ester, a hydrogenated rosin, a high acid number rosin, and a maleic modified rosin and wherein the tackifier resin is characterized by having an acid number of about 3 to about 10;

c) from about 15–about 35% by weight of a wax derived from a hydrogenated vegetable oil (a vegetable derived wax), the wax being characterized by having a melt viscosity of from about 50 to about 70 SUS at 210 degrees F., and a Mettler drop point of from about 130 degrees to about 170 degrees F.; and (d) the adhesive composition being characterized by having a DSC melt point of from about 50 degrees C. to about 80 degrees C., a melt viscosity of from about 1000–about 5000 cps at 350 degrees F., the adhesive composition being capable of binding a fibrous cellulosic article to an article selected from the group consisting of a fibrous cellulosic article, wood, metal, glass and plastic.

12. The adhesive as described in claim 11, wherein the preferred copolymer is a copolymer consisting essentially of an ethylene containing copolymer selected from the group consisting of an ethylene vinyl acetate polymer; and copolymers and terpolymers thereof.

13. The adhesive as described in claim 12, wherein the ethylene vinyl acetate copolymer is characterized by having a vinyl acetate content of from about 18% to 28%, the copolymer having a melt viscosity of from about 100,000–about 600,000 cP at 302 degrees F.

14. The adhesive as described in claim 12, wherein the vegetable derived wax is selected from the group consisting of soybean, corn, cottonseed, rape, canola, sunflower, palm, palm kernel, coconut, crambe, linseed and peanut wax.

15. The composition as described in claim 14, wherein the vegetable derived wax is derived from soybean.

16. The composition as described in claim 14, wherein the vegetable derived wax is derived from palm.

17. The adhesive as described in claim 14, wherein the adhesive composition is further characterized by having a DSC melting point which is preferably from about 53 degrees to about 58 degrees C.

18. The adhesive as described in claim 17, wherein the wax more preferably comprises from about 25%–about 35 % by weight of the composition.

19. The adhesive as described in claim 18, wherein the wax most preferably comprises from about 30%–about 35 % by weight of the composition.

20. The adhesive as described in claim 17, wherein the copolymer preferably comprises from about 30% to about 35 % by weight of the composition.

21. A composition for application to an article intended to be bonded to another article, the composition consisting essentially of a polymer, tackifier and a wax derived from a hydrogenated vegetable oil (a vegetable-derived wax), the polymer comprising from about 30% to about 35% by weight of the composition, the polymer being a thermoplastic copolymer consisting essentially of an ethylene containing copolymer, the copolymer being selected from the group consisting of an ethylene copolymer, an ethylene vinyl acetate copolymer, and copolymers and terpolymers thereof, the copolymer having a vinyl acetate content of from about 18%, the polymer having a melt viscosity of about 105,000 cp at 302 degrees F.;

the tackifier comprising from about 30% to about 35% by weight of the composition, the tackifier being characterized by having an acid number of from about 3 to about 10; and the wax comprising from about 30% to about 35% by weight of the composition, the wax comprising a triglyceride having a melting point between 136–160 degrees F, the triglyceride being characterized by having an iodine value of between 2 and 5, the composition being characterized by a viscosity of between 10 to 200 cps at 140 degrees F., wherein the triglyceride comprises a fatty acid, the fatty acid being stearic acid.

22. The composition as described in claim 21, wherein the vegetable derived wax is derived from soybean.

23. The composition as described in claim 21, wherein the vegetable derived wax is derived from palm.

24. A composition for application to an article intended to be bonded to another article, the composition consisting essentially of a polymer resin, tackifier and a wax derived from a hydrogenated vegetable oil (a vegetable-derived wax, a. the polymer resin comprising from about 30% to about 35% by weight of the composition, the polymer being a thermoplastic copolymer consisting essentially of an ethylene containing copolymer, the copolymer selected from the group consisting of an ethylene copolymer an ethylene vinyl acetate copolymer; and copolymers and terpolymers thereof, the ethylene vinyl acetate copolymer having a vinyl acetate content of 28%, the polymer having a melt viscosity of about 580,000 cp at 302 degrees F.;

b. the tackifier comprising from about 30% to about 35% by weight of the composition, the tackifier being characterized by having an acid number of from about 3 to about 10; and c. the wax comprising from about 30% to about 35% by weight of the composition, the wax comprising a triglyceride having a melting point between 136–160 degrees F, the triglyceride being characterized by having an iodine value of between 2 and 5, the composition being characterized by a viscosity of between 10 to 200 cps at 140 degrees F., wherein the triglyceride comprises a fatty acid, the fatty acid being stearic acid.

25. The composition as described in claim 24, wherein the vegetable derived wax is derived from soybean.

26. The composition as described in claim 24, wherein the vegetable derived wax is derived from palm.

* * * * *